United States Patent
Wong et al.

(10) Patent No.: US 7,444,368 B1
(45) Date of Patent: Oct. 28, 2008

(54) METHODS AND SYSTEMS FOR SELECTING METHODOLOGY FOR AUTHENTICATING COMPUTER SYSTEMS ON A PER COMPUTER SYSTEM OR PER USER BASIS

(75) Inventors: Leon Wong, Redmond, WA (US);
Sudhanshu Aggarwal, Bellevue, WA (US); Peter Beebee, New Rochelle, NY (US); Jesse Vincent, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 09/652,360

(22) Filed: Aug. 31, 2000

Related U.S. Application Data

(60) Provisional application No. 60/186,255, filed on Feb. 29, 2000.

(51) Int. Cl.
*G06F 15/16* (2006.01)
*G06F 15/173* (2006.01)
*G06F 7/04* (2006.01)
*G06F 7/58* (2006.01)

(52) U.S. Cl. .................. 709/200; 709/203; 709/225; 726/1; 726/2; 726/4; 726/16; 726/27

(58) Field of Classification Search .......... 709/223, 709/203; 705/12; 345/826; 707/104.1; 726/6, 18
See application file for complete search history.

(56) References Cited

U.S. PATENT DOCUMENTS

| | | | | |
|---|---|---|---|---|
| 5,586,260 A | * | 12/1996 | Hu | 726/12 |
| 5,721,780 A | * | 2/1998 | Ensor et al. | 713/155 |
| 5,774,650 A | * | 6/1998 | Chapman et al. | 726/7 |
| 5,875,432 A | * | 2/1999 | Sehr | 705/12 |
| 5,909,503 A | * | 6/1999 | Graves et al. | 382/135 |
| 5,923,756 A | * | 7/1999 | Shambroom | 713/156 |
| 5,930,804 A | * | 7/1999 | Yu et al. | 707/104.1 |
| 6,052,468 A | * | 4/2000 | Hillhouse | 380/281 |
| 6,170,057 B1 | * | 1/2001 | Inoue et al. | 713/153 |
| 6,173,406 B1 | * | 1/2001 | Wang et al. | 726/3 |
| 6,185,612 B1 | * | 2/2001 | Jensen et al. | 709/223 |
| 6,278,449 B1 | * | 8/2001 | Sugiarto et al. | 345/826 |
| 6,324,645 B1 | * | 11/2001 | Andrews et al. | 713/157 |
| 6,446,204 B1 | * | 9/2002 | Pang et al. | 713/153 |

(Continued)

OTHER PUBLICATIONS

"Role Based Access Control in Distributed Systems", Vandenwauver et al., 1997.*

(Continued)

*Primary Examiner*—Bunjob Jaroenchonwanit
*Assistant Examiner*—Angela Widhalm
(74) *Attorney, Agent, or Firm*—Perkins Coie LLP

(57) ABSTRACT

Method and systems are disclosed for enabling a computer system to generate a request that includes an instruction identifying the authentication method or methods to be used when authenticating a subset of the client computer systems or users network connected to a server computer system. The subset of client computer systems or users may include as little a single computer system or user. The request is then transmitted to the server computer system. When receiving subsequent requests for service from any of the subset of client computer systems or users, the server computer system will refer to the information in the instruction to determine which authentication methods are acceptable in authenticating the client computer system or user.

19 Claims, 5 Drawing Sheets

U.S. PATENT DOCUMENTS

| | | | |
|---|---|---|---|
| 6,470,447 B1* | 10/2002 | Lambert et al. | 713/151 |
| 6,691,232 B1* | 2/2004 | Wood et al. | 726/6 |
| 6,728,884 B1* | 4/2004 | Lim | 726/12 |
| 6,775,771 B1* | 8/2004 | Shrader et al. | 713/167 |
| 6,983,377 B1* | 1/2006 | Beesley et al. | 726/12 |
| 2001/0054101 A1* | 12/2001 | Wilson | 709/225 |
| 2002/0087894 A1* | 7/2002 | Foley et al. | 713/202 |
| 2003/0018913 A1* | 1/2003 | Brezak et al. | 713/201 |
| 2003/0097593 A1* | 5/2003 | Sawa et al. | 713/201 |
| 2003/0140112 A1* | 7/2003 | Ramachandran et al. | 709/217 |
| 2005/0127167 A1* | 6/2005 | Nakajima | 235/380 |
| 2005/0144463 A1* | 6/2005 | Rossebo et al. | 713/185 |
| 2005/0172341 A1* | 8/2005 | Kanno | 726/26 |
| 2006/0005044 A1* | 1/2006 | Uchikawa | 713/189 |
| 2007/0016795 A1* | 1/2007 | Asano | 713/182 |

OTHER PUBLICATIONS

"Modern Encryption Methods in User Authentication", Lass Huovinen, 1997.*

"Integrating Policy-Driven Role Based Access Control Security Architecture", Along ☐☐Lin, 1999.*

"Sesame GSS-API Mechanism", IETF Draft, Nov. 21, 1995.*

"SDSS Science Archives Security module API", Gyula P. Szokoly 1996.*

* cited by examiner

| CLIENT IDENTIFICATION FIELD 310 | ASSERTION FLAG 321 | BASIC HTTP FLAG 322 | DIGEST FLAG 323 | NTLM FLAG 324 |
|---|---|---|---|---|
| 220a | | | ✔ | ✔ |
| 220b | | | ✔ | ✔ |
| 220c | ✔ | | | |
| 220d | ✔ | | | |
| 220e | ✔ | ✔ | ✔ | ✔ |

300

AUTHENTICATION FIELDS 320

FIG. 3

METHODS AND SYSTEMS FOR SELECTING METHODOLOGY FOR AUTHENTICATING COMPUTER SYSTEMS ON A PER COMPUTER SYSTEM OR PER USER BASIS

CROSS-REFERENCE TO RELATED APPLICATIONS

The present application claims the benefit of U.S. provisional application Ser. No. 60/186,255, filed 29 Feb. 2000, which provisional application is incorporated herein by reference.

BACKGROUND OF THE INVENTION

1. The Field of the Invention

The present invention relates to the field of electronic communication. In particular, the present invention relates to methods and systems for selecting methodology for authenticating computer systems on a per computer system or per user basis.

2. The Prior State of the Art

"Authentication" is a process often used in computer networks whereby an item is determined to be what it is purported to be. Computer networks often use authentication when computer systems communicate with each other. Typically, a first computer system will use a request/response protocol to communicate with a second computer system. To accomplish this communication, the requesting computer system establishes a connection with the responding computer system. Next, the requesting computer system transmits certain requests to the responding computer system. The responding computer system will typically respond to these requests. Often, the response to the request will depend on the identity of the requesting computer system. Thus, the responding computer system often authenticates the identity of the requesting computer system in order to determine the appropriate response. In so doing, the requesting computer system may need to provide information to the responding computer system such as a password.

There are a variety of methodologies for authenticating a computer system. One method is to simply believe the requesting computer system is what it purports to be. This method will be referred to in this description and in the claims as the "assertion" method.

In another method often termed the "basic HTTP" authentication method, the requesting computer system sends a password over the computer network to the responding computer system. The responding computer system assumes that only the requesting computer system is aware of the correct password. Therefore, the responding computer system concludes that the request indeed came from the requesting computer system if the password is correct.

In a more recent HTTP authentication method termed the "MD5 Message Digest Authentication" method (hereinafter, "the digest" method), the password is not passed over the computer network at all. Instead, a series of numbers is generated based on a candidate password and other information about the request. These numbers are then hashed using the well-known MD5 hashing algorithm to form a "digest". The requesting computer system then sends the digest over the computer network to the responding computer system. The responding computer system takes the password that it knows to be correct, and forms its own digest by performing the same method on the correct password as the requesting computer system performed on the candidate password. The digest generated by the requesting computer system is then compared with the digest generated by the responding computer system. If the digests match, the responding computer system determines that the alleged requesting computer system also generated the digest based on the correct password and thus is indeed the authentic requesting computer system.

One authentication method that is native to WINDOWS NT® is termed the WINDOWS NT® LAN Manager or "NTLM" authentication method. In this method, the requesting computer system sends "credentials" including a user name and an encrypted password to the responding computer system.

The abilities of the requesting computer system (and the responding computer system) to handle certain authentication methods will differ from requesting computer system to requesting computer system and user to user.

For example, some requesting computer systems and users may have permissions to perform sensitive operations. It would seem inappropriate, even dangerous, to allow such requesting computer systems to authenticate using the untrustworthy assertion method. However, the assertion method may be entirely appropriate for requesting computer systems that only have permission to perform harmless operations.

Some authentication methods require common knowledge of passwords between the requesting computer system and the responding computer system. However, oftentimes the responding computer system will have no idea of the correct password for certain computer systems such as those residing outside of the responding computer system's corporate network. Thus, authentication methods that require common password knowledge may inappropriately deny service in some instances to requesting computer systems that lie outside of the corporate network. Therefore, what are desired are methods and systems for reducing denials of service to requesting computer systems that should have access to the service.

Even if the requesting client computer system can authenticate using one of the authentication methodologies accepted by the responding computer system, the requesting client computer system may try several unacceptable authentication methods first before finally trying one that is acceptable. Therefore, what are also desired are methods and systems for improving authentication efficiency.

SUMMARY OF THE INVENTION

The present invention relates to methods and systems for selecting authentication methodology to be used on a per computer system or on a per user basis. When a client computer system makes a request for service to a server computer system, the server often needs to authenticate the client before determining whether or not service should be granted. Sometimes, the client is not capable of authenticating using the authentication method or methods accepted by the server even if the client is what it claims to be. This will often result in a denial of service even though the client may have been entitled to the service if only it could authenticate.

By allowing the authentication methodology to be selected on a per computer system or on a per user basis, acceptable authentication methodologies may be more closely tailored to match the rights given to any given requesting computer system or user. For example, requesting computer systems that only have rights to perform harmless operations may be allowed to authenticate using an untrustworthy authentication method, while requesting computer systems that have rights to perform highly sensitive operations may be required to authenticate using more trustworthy authentication methods.

In addition, the principles of the present invention enable the acceptable authentication methodologies to more closely match the ability of the particular requesting computer system or user to authenticate and the ability of the responding computer system to authenticate the particular requesting computer system. For example, the responding computer system may have no knowledge of the correct password of requesting computer systems that reside outside of its immediate network. Thus, the responding computer system will be unable to authenticate any external requesting computer systems using authentication methodologies that require common password knowledge. According, if appropriate, the acceptable authentication methodologies for these computer systems may be selected to include authentication methodologies that do not require common password knowledge. Since the authentication methodologies can be selected on a per computer system and on a per user basis, the authentication methodologies may be selected to more closely match the rights and abilities of the requesting computer system and user. Thus, denials of service can potentially be reduced if authentication methods are so chosen. Also, authentication efficiency may be improved since the authentication ability of the requesting computer system may be considered when tailoring authentication methods. Thus, requesting computer system may be less likely to try numerous unsuccessful authentication methods before finally authenticating with an acceptable authentication method.

In accordance with the principles of the present invention, a computer system generates a request that includes an instruction identifying the authentication method or methods to be used when authenticating a subset of the client computer systems or users network connected to the server computer system. The subset of client computer systems may include as little as a single solitary computer system or user. The request is then transmitted to the server computer system. When receiving subsequent requests for service from any of the subset of client computer systems or users, the server computer system will refer to the information in the instruction to determine which authentication methods are acceptable in authenticating the client computer system. Thus, the present invention enables fine grain control over the authentication methods used for individual computer systems and users.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a data structure that stores and tracks the authentication methods that may be used to track each of the client computer systems of FIG. 2;

DETAILED DESCRIPTION OF THE INVENTION

The present invention extends to both methods and systems for selecting methodology for authenticating on a per computer system or on a per user basis. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage mediums such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
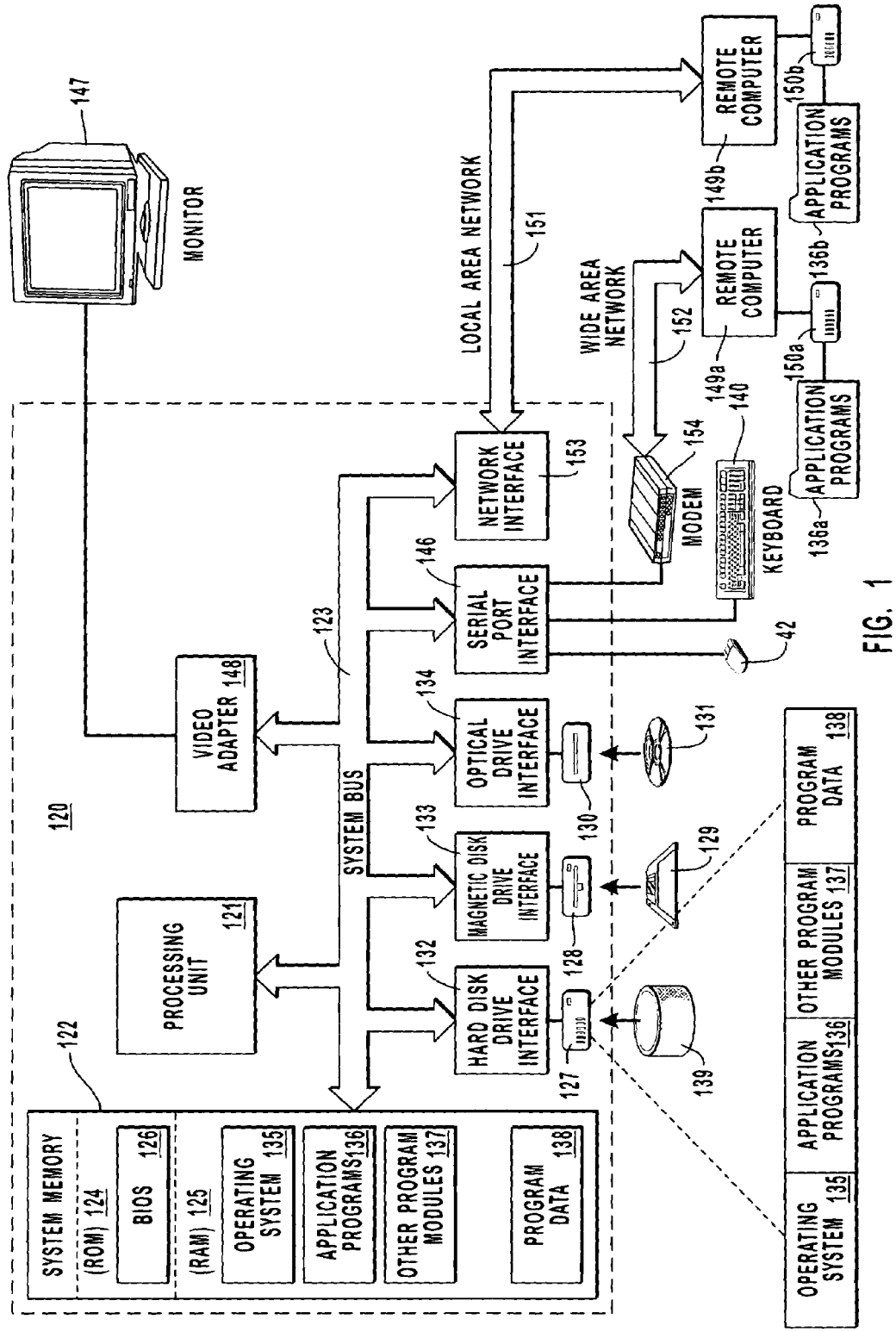
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically includes many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
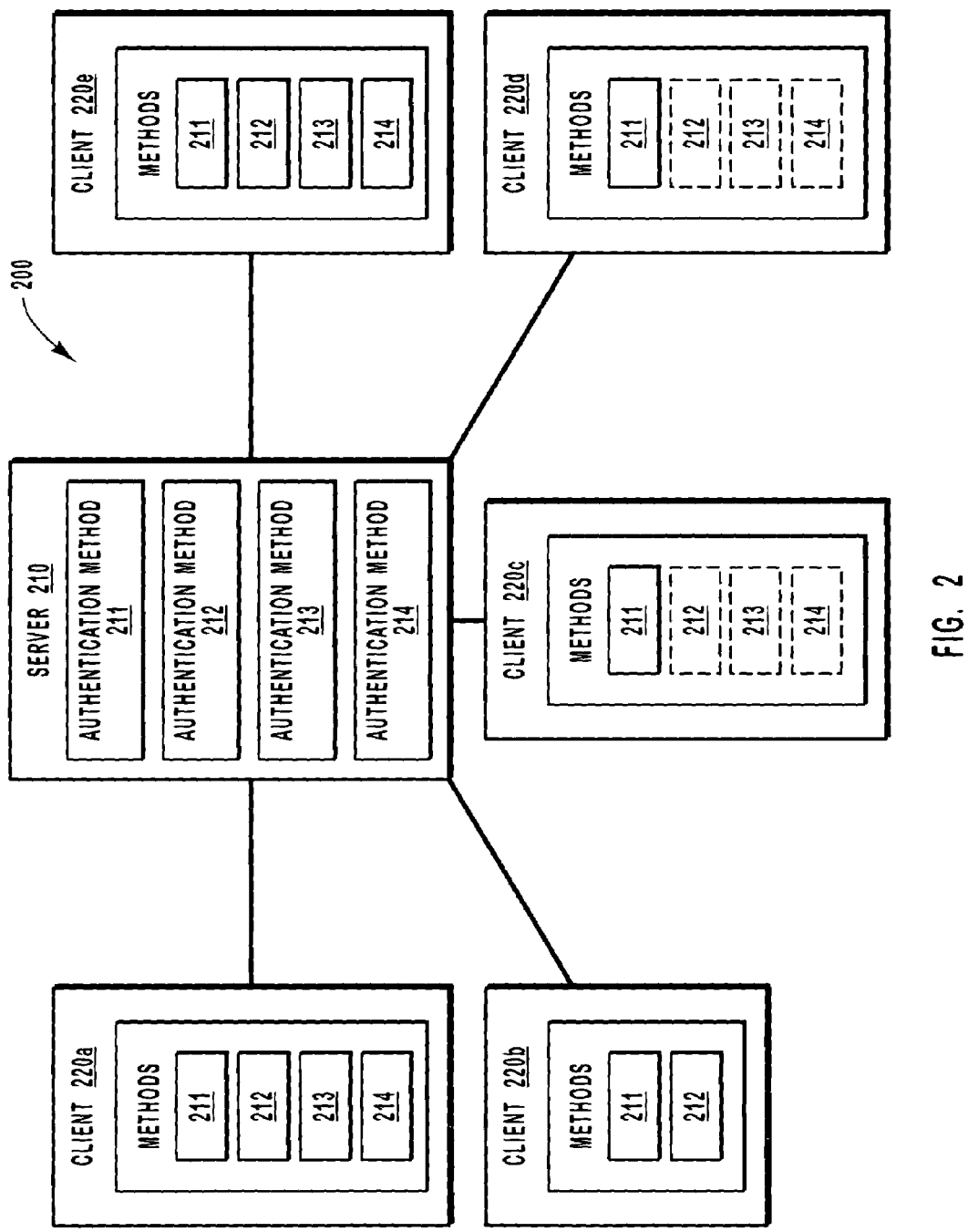
FIG. 2 is illustrates in more detail a client/server computer network that may be used in the operating environment of FIG. 1.

FIG. 2 illustrates a suitable network 200 in which the present invention may operate and will be referred to frequently in describing embodiments of the present invention. The network 200 includes a server computer system 210 that is network connected to a plurality of client computer systems 220 including five client computer systems 220a through 220e. Each of the server computer system 210 and the client computer systems 220a through 220e may be structured as described above for the computer 120 of FIG. 1 and include some or all of the components described as being included in the computer 120. However, many other computer devices may be used as the server computer system and client computer systems so long as they are capable of implementing the principles of the present invention as described herein.

In order to facilitate a clear understanding of the principles of the present invention, certain terms are hereinafter defined which are intended to be applied throughout this description and in the following claims.

In this description and in the claims, an "entity for authentication" is defined as a client computer system or user thereof which is to be authenticated.

In this description and in the following claims, a "client computer system" is defined as a computer or group of computers that uses the services of another computer system. A "server computer system" is defined as a computer or group of computers that provides services to another computer system. A "computer" is defined as any device capable of processing data such as a personal computer, a personal digital assistant, and the like.

Note that a computer system may use the services of another computer system and yet still provide services to yet other computer systems. Thus, a client computer system in one context may also be a server computer system in another context. Similarly, a server computer system in one context may also be a client computer system in another context. The use of the term "server computer system" for computer system 210 and "client computer system" for computer systems 220a through 220e is intended in the context of authentication. In other words, the computer system 210 is a server computer system because it serves by authenticating. The computer systems 220a through 220e are client computer systems because they are served by the server computer system 210 authenticating. The use of the term "server computer system" for the server computer system 210 is not intended to imply that the server computer system 210 cannot also be a client computer system in a different context. Similarly, the use of the term "client computer system" for the client computer systems 220a through 220e is not intended to imply that the client computer systems cannot also be server computer systems in a different context.

In this description and in the following claims, "network connected" means having a connection either directly or indirectly through one or more networks. The solid line connecting each of client computer systems 220a through 220e to the server computer system 210 represents that these client computer systems are network connected to the server computer system 210.

As each of the client computer systems 220 make a request to the server computer system 210, the server computer system 210 will perform services to authenticated client computer systems 220. Such as service may include, for example, access to presence information for use in instant messaging, the retrieval of a file, or the like.

The server computer system 210 is capable of performing authentication using any one or more of authentication methods 211, 212, 213 and 214. As an example, suppose that authentication method 211 is the "assertion" method, method 212 is the "basic HTTP" method, method 213 is the "digest" method, and method 214 is the NTLM method.

Many of the client computer systems are not able to authenticate using all of these authentication methods. For example, some may not be able to authenticate to the server computer system 210 using certain methods since the server computer system 210 lacks certain information such as passwords necessary for the server computer system to verify the identity of the client computer system. Others may not be able to authenticate certain methods due to technical limitations of the client computer system itself.

Referring to FIG. 2, client computer systems 220a and 220e have the ability to authenticate to the server computer system 210 using any one or more of the authentication methods 211, 212, 213 and 214.

However, due to technical limitations within the client computer system 220b itself, the client computer system 220b can only authenticate using authentication methods 211 and 212, but not authentication methods 213 and 214.

Client computer systems 220c and 220d are fairly sophisticated and generally have the ability to authenticate using authentication methods 211, 212, 213 and 214. However, the client computer systems 220c and 220d can only authenticate to the server computer system 210 using authentication method 211. Dashed boxes are use to identify authentication methods which the client computer system is generally capable of but which cannot be used to authenticate to the server computer system 210. For example, suppose that the server computer system 210 does not have knowledge of the correct passwords for client computer systems 220c and 220d, the client computer systems 220c and 220d would be unable to authenticate to the server computer system 210 using any authentication which requires knowledge of passwords.

Suppose that, although the server computer system 210 has the potential ability to authenticate using any one of authentication methods 211, 212, 213 and 214, the server computer system 210 is configured to authenticate using only the "digest" method 213 and "ntlm" method. In this case, client computer systems 220b, 220c and 220d would not be able to authenticate to the server computer system 210. Thus, client computer systems 220b, 220c and 220d would be denied service even though they should have access to the service if only they could authenticate themselves to the server computer system 210.

Now suppose that the server computer system 210 supports authentication methods 211, 212, 213 and 214. Suppose further that client computer systems 220c and 220d are both configured to try to authenticate using method 214. If unsuccessful, the client computer system would then try method 213, then method 212, and finally the assertion method 211. Authentication of client computer systems 220c and 220d would each require three unsuccessful authentication attempts before finally succeeding with method 211.

In accordance with the principles of the present invention, authentication efficiency can be improved and denials of service can be reduced by selecting the authentication methodologies that the server computer system 210 is to use on a per computer system basis (or on a per user basis) depending on the authentication abilities of each of the client computer systems and depending on the rights of the computer systems Suppose that some client computer systems have rights to perform highly sensitive operations using the server computer system 210. In this case, conventional wisdom would require the server computer system 210 be restricted to authentication methods that are reliable. The assertion method 211, for example, would be highly unreliable as that would require that the server computer system 210 simply believe the client computer system was what it is purported to be. If the server computer system 210 only allowed authentication using reliable methods, client computer systems 220c and 220d could never authenticate to the server computer system 210 even if they only had rights to perform harmless operations. The present invention allows for the selection of authentication methods on a per computer system basis and on a per user basis to take into consideration the rights of the associated client computer system.

FIG. 3 illustrates a data structure 300 that is accessible by the server computer system 210 and which is used to allow the authentication methods to be selected on a per computer system basis and/or on a per user basis. The data structure 300 includes a client identifier field 310 which identifies the client computer systems 220a through 220e. The client identifier field 310 could also identify users. The data structure also includes authentication fields 320 which identify the acceptable authentication methods for the corresponding client computer system. In FIG. 3, the authentication fields 320 contain a flag for each authentication method including assertion flag 321, basic HTTP flag 322, digest flag 323 and NTLM flag 324. The setting of a flag is represented by a check mark indicating that the corresponding authentication method is acceptable when authenticating that particular client computer system or user.

For example, referring to the first row of the data structure 300, acceptable authentication methods for client computer system 220a are the relatively reliable digest and NTLM methods. Less reliable authentication methods including the assertion and basic HTTP methods are not accepted as illustrated by the lack of a check mark for these fields. The client computer system 220a may have rights to perform highly sensitive operations using the server computer system 210. Therefore, it was appropriate that only reliable authentication methods be used to authenticate the client computer system 210.

Upon authentication, the server computer system 210 may communicate to the client computer system 220a the acceptable authentication methods. This allows the client computer system 220a to authenticate using acceptable authentication methods without going through the inefficiencies of first trying unacceptable authentication methods such as methods 211 and 212.

Referring to the second row of the data structure, acceptable authentication methods for the client computer system 220b also include only the reliable authentication methods 213 and 214 since the client computer system 220b has rights to perform sensitive operations using the server computer system 210. However, note that the client computer system 220b is not capable of authenticating using any of methods 213 and 214 to the server computer system 210. Accordingly, client computer system 220b will ultimately be denied service since acceptable authentication is not possible. However, the server computer system 210 would communicate the acceptable authentication methods to the client computer system 220b. The client computer system 220b could then infer the futility of trying to authenticate using methods 211 and 212 thereby efficiently concluding that authentication is denied without even having tried methods 211 or 212. If desired, the methods described herein may be used to alter the data structure so as to allow the client computer system 220b to use methods 211 and 212 to authenticate to the server computer system 210.

Proceeding down the data structure, acceptable authentication methods for client computer systems 220c and 220d include only the least reliable authentication method, assertion method 211. Client computer systems 220c and 220d may only have rights to perform harmless operations using the server computer system 210. Accordingly, it is appropriate that the client computer systems 220c and 220d be allowed to authenticate using any method they so choose. However, the server computer system 210 may lack information such as passwords necessary to authenticate client computer systems 220c and 220d using methods 212, 213 and 214. Accordingly, these methods 212, 213 and 214 are not designated as acceptable methods. During authentication, the server computer system 210 may communicate that the assertion method 211 is the only acceptable authentication method for the respective client computer systems 220c and 220d. In this case, the client computer systems 220c and 220d may forego attempts to try to authenticate using methods 212, 213 and 214. Instead, the client computer system 220c and 220d may immediately authenticate using the accepted assertion method 211 thereby foregoing the inefficiencies of having to first try unacceptable authentication methods.

In addition to the efficiency advantages, refraining from attempting unacceptable authentication methods has certain security advantages as well. For example, some methods of authentication including basic authentication reveal the user's password to the network. Thus, attempting basic authentication if basic authentication is not going to work would result in unnecessarily risking the revealing of the password.

Proceeding to the last row of the data structure 300, acceptable authentication methods for the client computer system 220e include all authentication methods 211, 212, 213 and 214. Accordingly, the client computer system 220e could authenticate using any of these authentication methods.

The structure of FIGS. 1, 2 and 3 represents a system in which and with which the present invention may operate. Although the server computer system 210 is network connected to five client computer systems in FIG. 2, the server computer system 210 may be network connectable to more or less than five client computer systems. Furthermore, the server computer system 210 may be connected to other server computer systems. In one example operating environment, the server computer system 210 is part of the constellation of computer systems that form the Internet.

Figure 4:
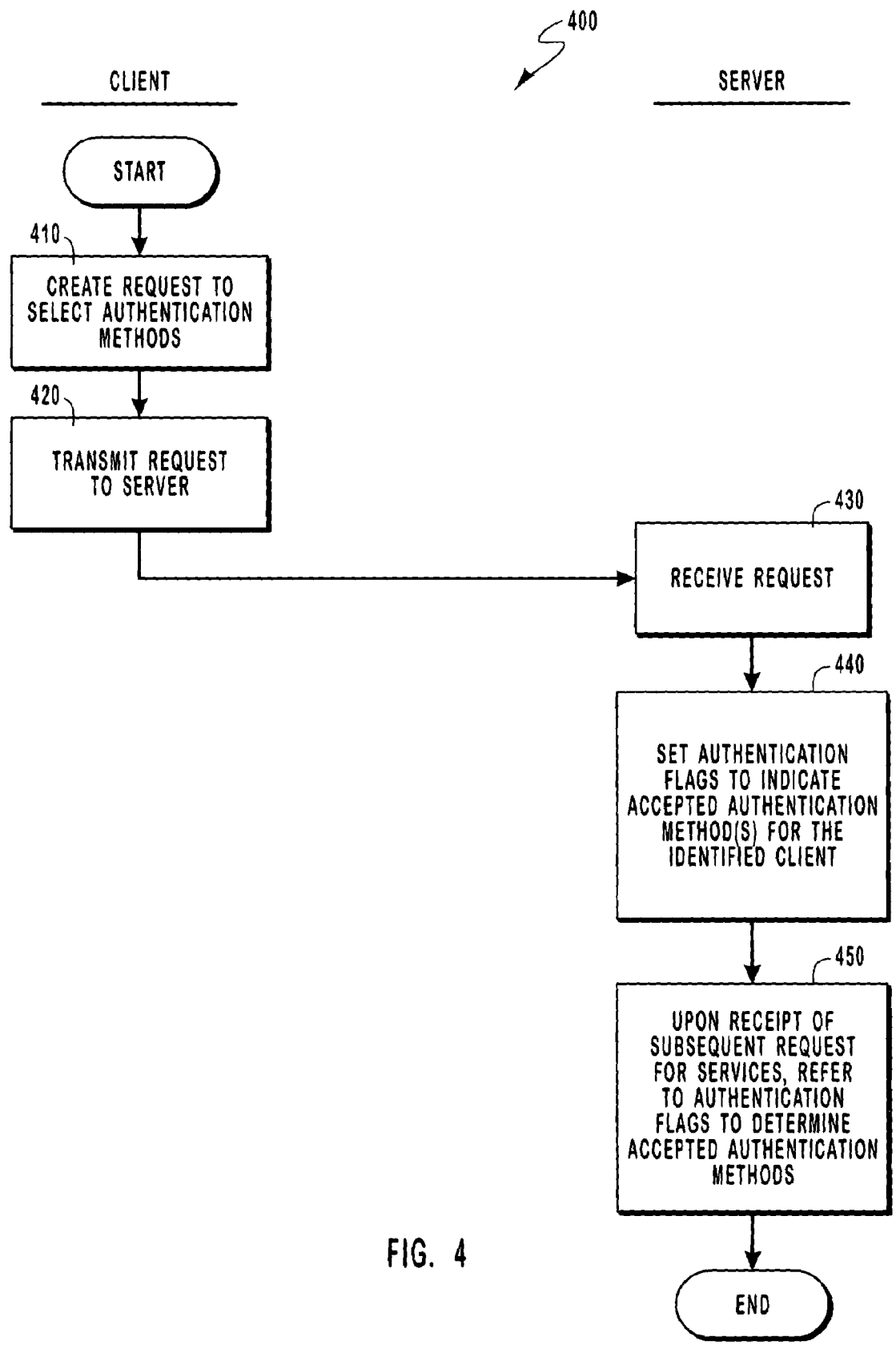
FIG. 4 illustrates a flowchart of a method of selecting authentication methods on a per computer system basis.

FIG. 4 illustrates a method 400 for selecting authentication methods to be used by the server computer system 210 on a per computer system basis. In other words, the claimed identity of the computer system will determine which authentication methods may be used to authenticate that computer system. In the following example, the client computer system 220e of FIG. 2 controls which authentication methods will be acceptable for each client computer system 220a through 220e. However, the control of the authentication methods may come from other computer systems as well.

In the method of FIG. 4, acts performed exclusively by the client computer system that controls which authentication methods are used (hereinafter, the "controlling client computer system") such as the client computer system 220e are listed directly below the heading "CLIENT" on the left-hand side of FIG. 4. Acts performed exclusively by the server computer system 210 are listed directly below the heading "SERVER" on the right-hand side of FIG. 4.

Referring to FIG. 4, the controlling client computer system creates a request that includes a selection of acceptable authentication methods (act 410) to be used against at least a subset of the plurality of client computer systems 220 when those client computer system request a service.

Figure 5:
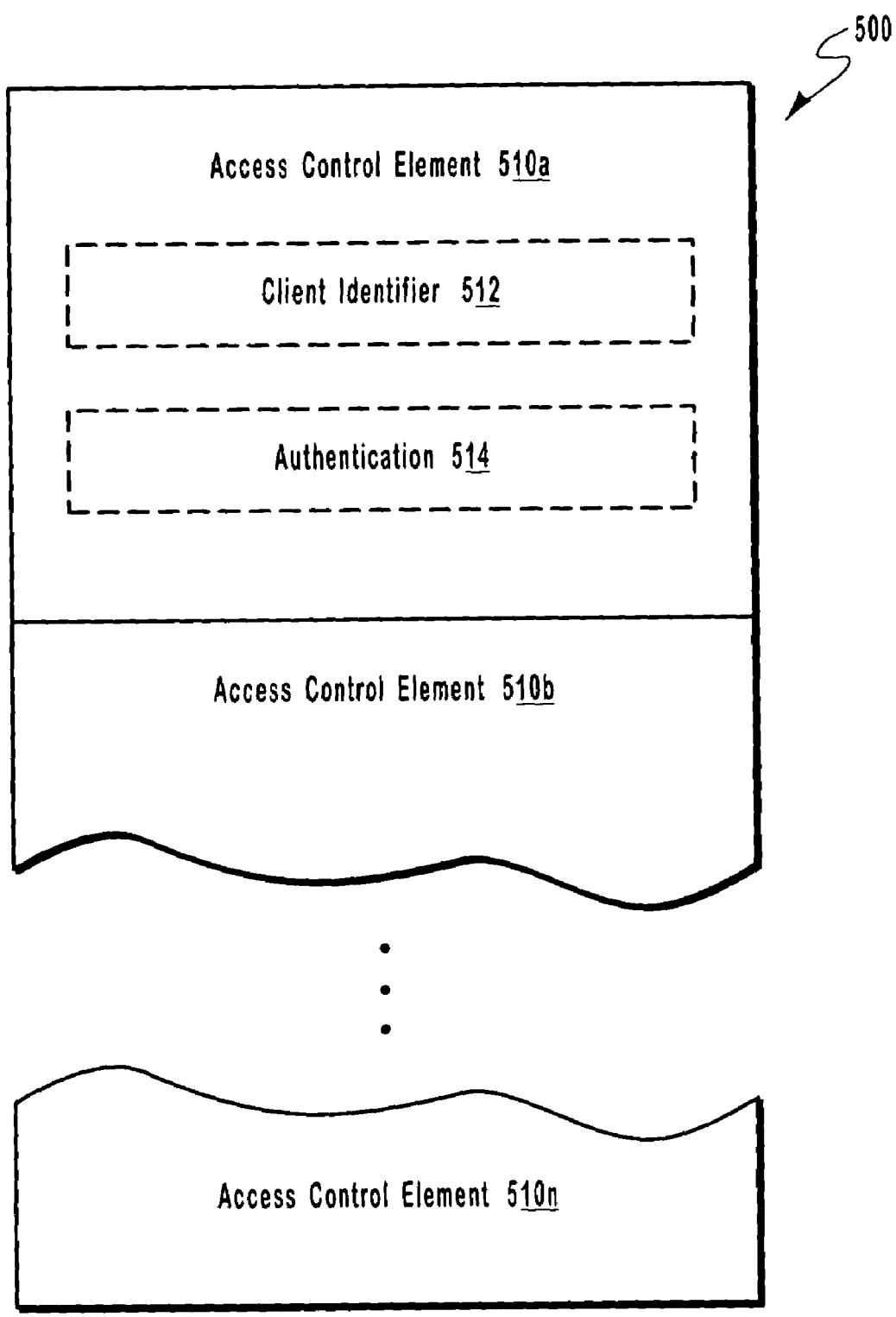
FIG. 5 illustrates in detail the data structure of a request used to make the selection of authentication methods.

FIG. 5 illustrates a data structure 500 of a request to select authentication methods. The data structure includes one or more access control element fields 510a through 510n. Each access control element field includes a client identifier field 512 that identifies the subset of client computer systems or users to which the authentication methods are to be applied. The subset of client computer systems may include as few as a single client computer system. In addition, each access control element field includes an authentication field 514 that identifies the authentication types used to authenticate the identified subset. Although these fields 512 and 514 are only shown for the first access control element field 510a, the other access control elements fields may each include similar fields for additional client computer systems and/or users.

The data structure 500 of the request may include an eXtensible Markup Language (XML) element or any other data structure that identifies the authentication methods and the computer systems and/or users to which those authentication methods will be applied. Take the following XML element as an example.

```
<?xml version="1.0"?>
<a:rvpacl xmlns:a="Schema URL">
    <a:acl>
        <a:inheritance>none</a:inheritance>
        <a:ace>
            <a:principal>
                <a:rvp-principal>
                    "Aliases URL"
                </a:rvp-principal>
                <a:credentials>
                    <a:digest/>
                    <a:ntlm/>
                </a:credentials>
            </a:principal>
        </a:ace>
    </a:acl>
</a:rvpacl>
```

In this XML element, the portion between <ca:ace> and </a:ace> defines an Access Control Element (ACE) that defines access permissions. This portion would correspond to the access control element field 510a shown in FIG. 5. The portion of the access control element that occurs between <a:rvp-principal> and </a:rvp-principal> defines the entity to whom the access permission is to apply (corresponds to the client identifier field 512 of FIG. 5). In the above example request, the Aliases Uniform Resource Locator (URL) corresponding to the entity represents client computer system 220*b*. The portion of the access control element that occurs between <a:credentials> and </a:credentials> describes authentication mechanisms that may be used to authenticate the client computer system 220*b* when requesting access to services (corresponds to the authentication field 514 of FIG. 5). This portion describes the two authentication methods that may be used when authenticating the client computer system 220*b*. Specifically, "<a:digest/>" means that the "digest" authentication method is acceptable while "<a:ntlm/>" means that the "ntlm" method is also acceptable.

Once the controller client computer system generates the request to select authentication methods (act 410), the controller client computer system then transmits the request to the server computer system (act 420). For example, the controller client computer system 220*e* may transmit to the server computer system 210 the request to allow the "digest" and "ntlm" authentication methods for authenticating client computer system 220*b*.

Once the request is received at the server computer system (act 430), subsequent requests for a service will result in the server computer system authenticating the client computer system using the authentication methods identified in the authentication selection request previously received from the controlling client computer system. Accordingly, embodiments within the scope of the present invention include a means or step for the server computer system authenticating the subset of the client computer systems using at least the authentication methodology identified in the instruction.

In one embodiment, the server computer system sets the appropriate authentication flags for the corresponding client computer system within the data structure 500 to represent the new authentication methods (act 440). Then, upon receiving subsequent requests for services, the server computer system determines how to authenticate based on the authentication flags within the data structure 500 (act 450). Although a specific example of a data structure that stores the authentication methods that are to be used for each client computer system, any data structure that can be referred to in determining the appropriate authentication methods will suffice.

The above describes methods and systems for selecting authentication methods on a per computer system basis and on a per user basis. Since the authentication methods may be tailored to each computer system, there may be fewer service denials due to authentication failure, and more efficient authentication.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method in a server computer system of authenticating client computer systems using various authentication mechanisms, the method comprising:

receiving from a controlling client computer system a first instruction identifying a first client computer system, identifying a first information related to the controlling client computer system available to the first client computer system through a service of the server computer system, and identifying at least one first authentication mechanism that can be used to authenticate the first client computer system, the first authentication mechanism specifying at least one first type of information necessary to verify a first purported identity of the first client computer system, the first client computer system having client-specific knowledge of the information necessary to verify the first purported identity of the first client computer system, the first client computer system being separate from the controlling client computer system;

receiving from the controlling client computer system a second instruction identifying a second client computer system, identifying a second information related to the controlling client computer system available to the second client computer system through the service of the server computer system, identifying a second authentication mechanism that can be used to authenticate the second client computer system, and identifying a third authentication mechanism that can be used to authenticate the second client computer system, the second authentication mechanism specifying a second type of information necessary to verify a second purported identity of the second client computer system, the second client computer system having client-specific knowledge of the information necessary to verify the second purported identity of the second client computer system, the third authentication mechanism specifying a third type of information necessary to verify a third purported identity of the second client computer system, the second client computer system having client-specific knowledge of the information necessary to verify the third purported identity of the second client computer system, the second client computer system being separate from the controlling client computer system;

storing, for the first client computer system, an indication of the first authentication mechanism;

storing, for the second client computer system, an indication of the second authentication mechanism and the third authentication mechanism;

after receiving the first instruction and before authenticating the first client computer system, receiving a first request from the first client computer system to access the service of the server computer system, the first request including information of the type specified by the first authentication mechanism that is necessary to verify the first purported identity of the first client computer system, wherein the information is known specifically to the first client computer system;

initially authenticating the first client computer system using the first authentication mechanism based on the information received from the first client computer system that is necessary to verify the first purported identity of the first client computer system;

after receiving the second instruction and before authenticating the second client computer system, receiving a second request from the second client computer system to access the service of the server computer system;

upon receiving the second request from the second client computer system to access the service of the server computer system, selecting a selected authentication mechanism from the second and third authentication mechanisms, the selected authentication mechanism being different from the first authentication mechanism; and authenticating the second client computer system using the selected authentication mechanism based on information received from the second client computer system that is necessary to verify the second or third purported identity of the second client computer system corresponding to the selected authentication mechanism.

2. The method of claim 1 wherein selecting the selected authentication mechanism is based on an ability of the server computer system to support the second and third authentication mechanisms and access rights of the second client computer system to access resources of the service of the server computer system.

3. The method of claim 1 wherein the second request includes information of the type specified by the third authentication mechanism that is necessary to verify the third purported identity of the second client computer system, wherein the information is known specifically to the second client computer system, the method further comprising initially authenticating the second client computer system using the third authentication mechanism based on the information received from the second client computer system that is necessary to verify the third purported identity of the second client computer system.

4. The method of claim 3, wherein the third authentication mechanism is the same as the first authentication mechanism.

5. The method of claim 1 wherein the selected authentication mechanism includes an assertion authentication, and wherein the type of information specified by the assertion authentication is an indication of an identity of the second client computer system.

6. The method of claim 1 wherein the selected authentication mechanism includes a basic HTTP authentication, and wherein the type of information specified by the basic HTTP authentication is a password of the second client computer system.

7. The method of claim 1 wherein the selected authentication mechanism includes digest authentication, and wherein the type of information specified by the digest authentication is a digest generated by hashing a series of numbers associated with the second client computer system.

8. The method of claim 1 wherein the selected authentication mechanism includes an NTLM authentication, and wherein the type of information specified by the NTLM authentication comprises credentials of the second client computer system, wherein the credentials include a user name and an encrypted password of the second client computer system.

9. A method in a controlling client computer system for providing indications of authentication mechanisms to a server computer system, the method comprising:

generating a first instruction identifying a first client computer system, identifying a first resource of information related to the controlling client computer system of a service of the server computer system, and identifying a first authentication mechanism that can be used to authenticate the first client computer system, the first authentication mechanism specifying a type of information necessary to verify a purported identity of the first client computer system, the first client computer system having client-specific knowledge of the information necessary to verify the purported identity of the first client computer system, the first client computer system being different from the controlling client computer system;

generating a second instruction identifying a second client computer system, identifying a second resource of information different from the first resource of information and related to the controlling client computer system of the service of the server computer system, and identifying a second authentication mechanism different from the first authentication mechanism that can be used to authenticate the second client computer system, the second authentication mechanism specifying a type of information necessary to verify a purported identity of the second client computer system, the second client computer system having client-specific knowledge of the information necessary to verify the purported identity of the second client computer system, the second client computer system being different from the controlling client computer system; and sending the first and second instructions to the server computer system so that upon receiving a first request from the first client computer system to access information related to the controlling client computer system through the service of the server computer system, after the first instruction is received at the server computer system, the server computer authenticates the first client computer using the first authentication mechanism and provides the first resource of information to the first client computer based on the first instruction, and upon receiving a second request from the second client computer system to access information related to the controlling client computer system through the service of the server computer system, after the second instruction is received at the server computer system, when the second client computer system can be authenticated using multiple authentication mechanisms, the server computer system selects a selected authentication mechanism based on authentication abilities of the second client computer system to support the selected authentication mechanism, authentication abilities of the server computer system to support the selected authentication mechanism, and access rights of the second client computer system to access information related to the controlling client computer system, the server computer system initially authenticates the second client computer system using the selected authentication mechanism based on information received from the second client computer system that is necessary to verify the purported identity of that client computer system, and in response to the authentication of the second client computer system, the server computer system provides the second resource of information.

10. The method of claim 9 wherein a plurality of instructions indicate that the same authentication mechanism is to be used to authenticate multiple client computer systems when associated with the same resource of information related to the controlling client computer, and wherein the multiple client computer systems are authenticated by the server computer system using the indicated authentication mechanism.

11. The method of claim 9 wherein the selected authentication mechanism includes an assertion authentication, and wherein the type of information specified by the assertion authentication is an indication of an identity of the second client computer system.

12. The method of claim 9 wherein the selected authentication mechanism includes a basic HTTP authentication, and wherein the type of information specified by the basic HTTP authentication is a password of the second client computer system.

13. The method of claim 9 wherein the selected authentication mechanism includes digest authentication, and wherein the type of information specified by the digest authentication is a digest generated by hashing a series of numbers associated with the second client computer system.

14. The method of claim 9 wherein the selected authentication mechanism includes an NTLM authentication, and wherein the type of information specified by the NTLM authentication comprises credentials of the second client computer system, wherein the credentials include a user name and an encrypted password of the second client computer system.

15. A physical computer-readable medium containing instructions for controlling a server computer system to authenticate entities using various authentication mechanisms, by a method comprising:
receiving from a controlling client computer system a first instruction identifying a first client computer system, identifying a first information related to the controlling client computer system available to the first client computer system through a service of the server computer system, and identifying at least one first authentication mechanism that can be used to authenticate the first client computer system, the first authentication mechanism specifying at least one first type of information necessary to verify a first purported identity of the first client computer system, the first client computer system having client-specific knowledge of the information necessary to verify the first purported identity of the first client computer system, the first client computer system being separate from the controlling client computer system;
receiving from the controlling client computer system a second instruction identifying a second client computer system, identifying a second information related to the controlling client computer system available to the second client computer system through the service of the server computer system, identifying a second authentication mechanism that can be used to authenticate the second client computer system, and identifying a third authentication mechanism that can be used to authenticate the second client computer system, the second authentication mechanism specifying a second type of information necessary to verify a second purported identity of the second client computer system, the second client computer system having client-specific knowledge of the information necessary to verify the second purported identity of the second client computer system, the third authentication mechanism specifying a third type of information necessary to verify a third purported identity of the second client computer system, the second client computer system having client-specific knowledge of the information necessary to verify the third purported identity of the second client computer system, the second client computer system being separate from the controlling client computer system;
storing, for the first client computer system, an indication of the first authentication mechanism;
storing, for the second client computer system, an indication of the second authentication mechanism and the third authentication mechanism;
after receiving the first instruction and before authenticating the first client computer system, receiving a first request from the first client computer system to access the service of the server computer system, the first request including information of the type specified by the first authentication mechanism that is necessary to verify the first purported identity of the first client computer system, wherein the information is known specifically to the first client computer system;
initially authenticating the first client computer system using the first authentication mechanism based on the information received from the first client computer system that is necessary to verify the first purported identity of the first client computer system;
after receiving the second instruction and before authenticating the second client computer system, receiving a second request from the second client computer system to access the service of the server computer system;
upon receiving the second request from the second client computer system to access the service of the server computer system, selecting a selected authentication mechanism from the second and third authentication mechanisms, the selected authentication mechanism being different from the first authentication mechanism; and
authenticating the second client computer system using the selected authentication mechanism based on information received from the second client computer system that is necessary to verify the second or third purported identity of the second client computer system corresponding to the selected authentication mechanism.

16. The physical computer-readable medium of claim 15 wherein selecting the selected authentication mechanism is based on an ability of the server computer system to support the second and third authentication mechanisms and access rights of the second client computer system to access resources of the service of the server computer system.

17. The physical computer-readable medium of claim 15 wherein the second request includes information of the type specified by the third authentication mechanism that is necessary to verify the third purported identity of the second client computer system, wherein the information is known specifically to the second client computer system, the method further comprising initially authenticating the second client computer system using the third authentication mechanism based on the information received from the second client computer system that is necessary to verify the third purported identity of the second client computer system.

18. The physical computer-readable medium of claim 15, wherein the third authentication mechanism is the same as the first authentication mechanism.

19. The physical computer-readable medium of claim 15 wherein the selected authentication mechanism is a member of a group consisting of an assertion authentication, a basic HTTP authentication, a digest authentication, and an NTLM authentication.

* * * * *